United States Patent [19]

Ryden

[11] Patent Number: 5,432,840
[45] Date of Patent: Jul. 11, 1995

[54] METHOD AND ARRANGEMENT FOR CONNECTING SELECTIVELY A STATIONARY SUBSCRIBER APPARATUS TO A NEIGHBORING MOBILE SUBSCRIBER APPARATUS WITH THE AID OF A TELEPHONE SWITCHBOARD FUNCTION

[76] Inventor: Leif C. Ryden, Hollandsresan 192, 757 55 Uppsala, Sweden

[21] Appl. No.: 64,051
[22] PCT Filed: Nov. 25, 1991
[86] PCT No.: PCT/SE91/00800
§ 371 Date: May 18, 1993
§ 102(e) Date: May 18, 1993
[87] PCT Pub. No.: WO92/10069
PCT Pub. Date: Jun. 11, 1992

[30] Foreign Application Priority Data

Nov. 27, 1990 [SE] Sweden ................... 9003771

[51] Int. Cl.⁶ ............................. H04Q 7/24
[52] U.S. Cl. ........................... 379/58; 379/63; 455/33.1
[58] Field of Search ............ 455/54.2, 33.1, 54.1; 379/58, 59, 60, 63, 67, 91, 6

[56] References Cited

U.S. PATENT DOCUMENTS 4,399,555 8/1983 MacDonald et al. ............. 455/33.1
4,737,977 4/1988 Norman .
4,740,788 4/1988 Konneker .
4,922,514 5/1990 Bergeron ....................... 379/6

FOREIGN PATENT DOCUMENTS 0076646 4/1983 European Pat. Off. .
402513 7/1983 Sweden .
8903106 4/1989 WIPO .

Primary Examiner—Curtis Kuntz
Assistant Examiner—William D. Cumming
Attorney, Agent, or Firm—Burns, Doane, Swecker & Mathis

[57] ABSTRACT

A method and a system for connecting a stationary subscriber apparatus selectively to a mobile subscriber apparatus through a telephone subscriber exchange, which includes a call switching function, by means of which incoming calls can be transferred, and which is connected to a number of stationary subscriber apparatus included in the telephone system and a number of mobile subscriber apparatus also included in said system, and computer apparatus included in the switchboard, in response to a call from a stationary subscriber apparatus to a telephone number relating to a plurality of mobile subscriber apparatus, for instance a group number. Upon receipt of a call, the telephone switchboard or subscriber exchange and the computer apparatus ascertain or establish the geographical area and/or geographical location of the stationary subscriber apparatus of each mobile telephone apparatus that is marked unoccupied, wherein the call received is transferred to the selected mobile subscriber apparatus.

3 Claims, 2 Drawing Sheets

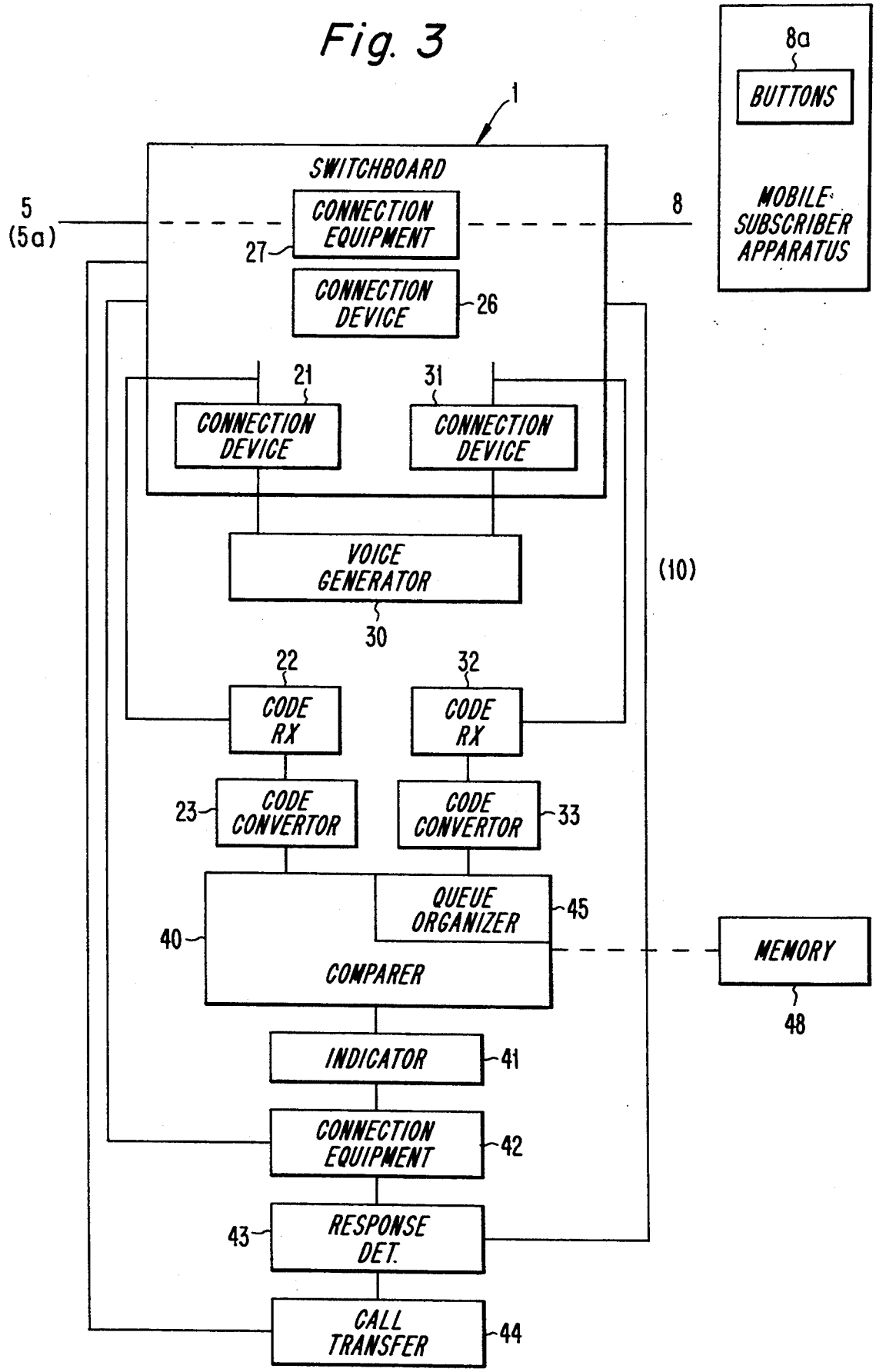

METHOD AND ARRANGEMENT FOR CONNECTING SELECTIVELY A STATIONARY SUBSCRIBER APPARATUS TO A NEIGHBORING MOBILE SUBSCRIBER APPARATUS WITH THE AID OF A TELEPHONE SWITCHBOARD FUNCTION

TECHNICAL FIELD

The present invention relates primarily to a method of connecting selectively stationary subscriber apparatus to a mobile subscriber apparatus through a telephone subscriber exchange which includes a telephone switch function or switchboard function, by means of which incoming calls can be transferred and which is connected to a number of stationary subscriber apparatus included in the telephony system and a number of mobile subscriber apparatus, such as taxi-carried telephone apparatus, which also form part of said system, and computer apparatus included in the switchboard, in response to a call from a stationary subscriber apparatus to a telephone number relating to a plurality of mobile subscriber apparatus, said number being referred to hereinafter as the "group number".

The invention also relates to a system in which the system components coact and are mutually connected in a manner to operate in accordance with the inventive method.

Reference is made in the following description to "subscriber apparatus which belong to a stationary system" or "stationary subscriber apparatus" and it will be understood that this category of apparatus does not solely include those apparatus which can be connected to a telephone exchange or switchboard with the aid of physical telephone lines, but also to other forms of immobile (or mobile) telephones. It is significant to the invention, however, that the geographical area or location of a particular stationary telephone apparatus and of the person using said apparatus can be readily determined.

Reference is also made in the following description to "subscriber apparatus which belongs to the mobile system" or to "mobile telephone apparatus" By this expression is meant a subscriber apparatus which is installed in a mobile unit, such as a taxi, express delivery vehicle, a public service vehicle and the like, which carry mobile telephone equipment and with which it is possible to establish the exact geographical location of the mobile unit concerned or the exact geographical area in which said unit is located in a positive fashion.

In this latter case, it may concern a "stationarily connected subscriber apparatus" when the mobile subscriber apparatus has informed that it receives calls at a particular place, at the subscriber apparatus of a taxi station or the like.

It will be obvious to the technician skilled in this field which type of subscriber apparatus shall be used within the two aforesaid categories.

It is also stated in the description that the "subscriber apparatus" are active in making calls or leaving messages, although it will be understood that each such function of a subscriber apparatus is initiated and effected by the person operating the subscriber apparatus concerned.

When one of the stationary subscriber apparatus belonging to the system establishes a connection to a "group number", it will be understood that the "group number" selected in this case is not served directly by a number of mobile subscriber apparatus, which belongs to the earlier known art, but that before the call is connected a particular mobile telephone apparatus selected according to certain merits.

Furthermore, the term "telephone exchange" or "switchboard function" as used here, does not only indicate telephone stations but also subscriber exchanges and the like, although the telephone switchboard used must have a built-in so-called call "transfer function" capable of being activated and influenced by computer equipment.

BACKGROUND ART

With regard to the significant properties and characteristic features of the present invention, several types of telephone exchanges or telephone stations are known to the art which fulfill the aforesaid conditions that are fundamental to the function of the present invention.

The present invention is based on the use of a telephone subscribes exchange incorporating a switchboard function to as a call transfer or "transfer function".

The call transfer function as such is earlier known and is included in many telephone switchboards, such as subscriber exchanges. During a call in progress between a calling person, i.e. a first person, and a called person, a second person, the call transfer function enables the called, second person, to call a third person and transfer the call in progress so as to establish a call connection between the calling person, i.e. the first person, and the third person called by the second person, without the second person taking part in the call transfer.

Such a call transfer function is initiated by the called, second person, by activating a switch on the telephone keyboard (normally a button) in a manner applicable to the telephone switchboard or exchange concerned.

The second person is then disconnected completely from the call connection established by the call transfer function between the first and the third persons.

The telephone switchboard retailed by "Ericsson" of Stockholm, Sweden, under the designation "AXE-station", is an example of a telephone switchboard or exchange that is provided with such a call transfer function.

The present invention can be expected to obtain particular application as a so-called taxi-exchange, i.e. a telephone switch which is particularly adapted for taxi vehicles, where a telephonist is able to receive and to give information concerning the transportation requirements of customers, etc., where each customer is able to dial a single telephone number, preferably a readily memorized telephone number, for a particular group of taxi vehicles.

With regard to telephone switchboards which are adapted for use with taxi vehicles or other transportation means, it is known to provide each taxi with a computer and printer and to transmit printed messages to a particular taxi from a telephone switchboard with the aid of wireless or cordless data transmission means.

This system also enables each taxi to indicate to the switchboard and/or its telephone operator the area and/or the location in which the taxi concerned is found at any one particular time, this information being inserted into a queue system so that should a person require the services of a taxi and call the telephone switchboard, the telephonist is able to communicate with that taxi which has the highest priority on the list and is, at that moment in time, nearest to the address of the person concerned or has the easiest route to said address.

Telephone exchange systems which are adapted for communication with taxis by means of radiowave transmission are also known to the art.

Telephone exchange systems adapted for servicing a large number of taxis are always manned by a greater or smaller number of telephone operators.

Also belonging to the prior art is a system in which a stationary subscriber is able to dial a group number and the call is switched directly to a mobile subscriber apparatus which while being free to take an incoming call is not necessarily free to accept a fare, irrespective of the geographical position of the taxi, it being possible to connect a call directly between the stationary subscriber apparatus and the mobile subscriber apparatus selected randomly by the telephone system.

The publication SE-B-402513 discloses a system, constituting the background art for the present invention. However, the known system (page 4) is constructed so that the caller must know a code, related to the area including the address, and the used telephone number must include two digits (Ni.N2) identifying said area.

The present invention has as its goal to eliminate these two digits.

DISCLOSURE OF THE PRESENT INVENTION

Technical Problems

When considering the present state of the art as described above, it will be seen that a qualified technical problem resides in the provision of a method and a system which will enable any stationary subscriber apparatus belonging to the system to be placed, via a group number, into direct communication with a "selected" mobile subscriber apparatus belonging to said system, such as a mobile subscriber apparatus carried by a taxi vehicle without the need of memorizing a two-digit code, so as to enable the caller to speak directly to the driver concerned and to place an order and to give appropriate route directions, for instance to specify the geographical area from which the call is made and/or the location from which said call is made, together with other desiderata to the selected mobile subscriber apparatus which is nearest to the address in question or which is indicated by a computer selection means on the basis of other criteria.

It will also be seen that a technical problem resides in the provision of a method which will enable a selected speech connection to be established without needing to pass through a telephone operator and for a telephone operator to communicate a requirement, which must thereafter be passed on.

A further technical problem in this respect is one of enabling a call to be connected automatically to a mobile subscriber apparatus which is not only located in the vicinity of the caller but is also free to accept the call and also free to accept the fare.

When considering those conditions, which are fundamental to the present invention, it will be seen that a technical problem resides in realizing the need of utilizing the possibility of ascertaining the geographical area and/or geographical location of each stationary subscriber apparatus in a sure and simple fashion.

Another technical problem is one of realizing the simplifications that can be achieved in the system by utilizing the district coding of subscribers having similar telephone prefix numbers allotted by the public telephone administration.

When taking the above into consideration, it will be seen that a technical problem resides in the provision of conditions which will enable a telephone switchboard subscriber (exchange) and computer apparatus to evaluate and establish the geographical areas and/or locations applicable at that moment in time for a number of mobile subscriber apparatus and to store requisite data in sequence in the area concerned.

It will also be seen that a technical problem resides in realizing the significance of creating conditions such that when one stationary subscriber apparatus belonging to the system among a plurality of possible stationary subscriber apparatus is connected to a telephone switchboard in response to a call made to a "group number" such that said call can be "transferred" without the service of a telephonist and via means belonging to the switchboard to the mobile subscriber apparatus which, at that particular moment, has the highest priority, is nearest to the geographical location of the stationary subscriber apparatus or has the simplest route to said geographical location, and thereafter to create conditions for establishing, via a call transfer function, a speech connection between the stationary subscriber apparatus and the selected mobile subscriber apparatus.

It will also be seen that a technical problem resides in establishing the geographical area or geographical location of the stationary subscriber apparatus in a simple fashion and then realizing the significance of utilizing the possibility found incorporated in certain telephone exchanges, namely the possibility of ascertaining the caller's subscriber number or of utilizing the caller's own ability to activate upon request a code corresponding to the area in question, through the keyboard, buttons, on his telephone apparatus.

It must also be considered a technical consideration to realize that such a code may either constitute the first digits, normally the first two or three digits, of the telephone number of the stationary subscriber apparatus concerned, or to insert through the telephone buttons a code relevant to the distribution Of mail within the area concerned, where both codes can be used to define a given specific area.

It is also a technical insight to utilize the whole of the telephone number in order to ascertain the geographical location together with a complete address with the aid of computer means.

It will also be seen that a technical problem is one of realizing that a system of the aforesaid kind which succeeds in solving one or more of the aforesaid technical problems can also be complemented with a taxi prebooking facility, such that when a stationary subscriber apparatus calls a group number and is connected to a computer belonging to the telephone switchboard, the caller is able to insert through the buttons on his telephone apparatus information concerning the prebooking and to create conditions such as to set-up a call connection from the telephone switchboard and/or its computer equipment to a selected mobile subscriber apparatus prior to the time for which the taxi has been ordered, informing said mobile subscriber apparatus of the pre-booking.

Another technical problem is one of realizing the advantages that are afforded by connecting a separate computer in a telephone switchboard having a call transfer function to outgoing lines, said separate computer being adapted to satisfy the significant features of the invention.

It is also a technical consideration to vary the number of lines used to meet prevailing traffic situations, in a known manner, such as to meet the number of mobile subscriber apparatus that are free at that time.

Solution

The present invention provides a solution to one or more of the aforesaid technical problems by means of the inventive method and inventive system.

The present invention is based on a method of connecting a stationary subscriber apparatus selectively to a mobile subscriber apparatus, or on the basis of other criteria, through a telephone subscriber exchange which includes a telephone switching function, by means of which incoming calls can be transferred and connected to a number of stationary subscriber apparatus included in the telephony system and a number of mobile subscriber apparatus also form included in said system, and computer apparatus included in the switchboard, in response to a call from a stationary subscriber apparatus to a telephone number relating to a plurality of mobile subscriber apparatus, for instance a group number.

In accordance with the invention, it is proposed that when receiving a call, the telephone switchboard (subscriber exchange) and/or the computer apparatus ascertains the geographical area and/or geographical location of the stationary subscriber apparatus; that the telephone switchboard and/or the computer apparatus establishes and stores the geographical areas and/or the geographical locations of a number of mobile subscriber apparatus in the near vicinity and stores the locations of said apparatus in sequence, and that the call received is transferred to the selected mobile subscriber apparatus which at that moment has been allotted the highest priority, such as belongs to the area concerned, has waited the longest and/or is the nearest mobile telephone apparatus to the calling address and/or is the only vehicle available for driving to the geographical address of the stationary subscriber apparatus; and that subsequent to establishing the selection of a mobile subscriber apparatus through the computer apparatus, a direct speech connection is established between the calling stationary apparatus and the mobile apparatus selected by the computer apparatus and called by the telephone switchboard.

In accordance with proposed embodiments lying within the scope of the inventive concept, it is proposed that the geographical area or geographical location of the stationary subscriber apparatus is ascertained automatically either by the telephone switchboard and the computer or by asking the caller to enter into subscriber apparatus, a code corresponding to the area concerned, for instance a code in the form of the first digits of a telephone number or a zip code or postal code applicable to said area, or some like code.

Subsequent to the computer having established a connection to the telephone switchboard, each mobile subscriber apparatus is assigned a queue number and the queue order is normally constructed in accordance with the following system: Belongs to the area, and when several mobile apparatus belong to one and the same area, "first in, first out".

It has been found particularly advantageous to provide the telephone switchboard and/or the computer apparatus with means capable of initiating and creating artificial speech and able to give the caller certain instructions and to ask certain questions and which is able to give answers, normally in response to codes that are inserted by manipulating the buttons on the subscriber apparatus in a given sequence.

In accordance with the present invention, the telephone switchboard and computer apparatus can be adapted to deal with pre-bookings, such that the stationary subscriber apparatus is able to insert the time at which a vehicle is required, etc., and such that just prior to the time at which the taxi is required, the computer will connect the switchboard to a mobile subscriber apparatus, selected by the computer, informing the mobile apparatus of the booking earlier made, preferably in an artificial speech mode.

Advantages

Those advantages primarily afforded by means of the inventive method and inventive system reside in the possibilities of readily establishing direct telephone contact between a stationary subscriber apparatus and a computer-selected mobile telephone apparatus situated in the near vicinity of the calling apparatus, via a call transfer function incorporated in the telephone switchboard or subscriber telephone exchange, said selected mobile apparatus being free to receive telephone calls and free to accept the fare, despite a call being directed by the stationary subscriber apparatus to a group telephone number which is common to a plurality of mobile subscriber apparatus.

Because the computer apparatus is able to initiate and create artificial speech, the telephone switchboard controlling the taxi vehicles is able to operate without the aid of telephone operators.

Furthermore, the time lapse from the time of making the call to the time of establishing the connection with a mobile apparatus is shortened, even in the "rush hour", and the caller will obtain direct contact with a mobile subscriber apparatus selected on the basis of different criteria instead of obtaining telephone contact through the service of a telephone operator, who can only divulge desired information.

BRIEF DESCRIPTION OF THE DRAWINGS

A proposed embodiment of a system at present preferred and exhibiting the characteristic features significant of the present invention will now be described in more detail with reference to the accompanying drawings, in which

FIG. 3 is a simplified block schematic illustrating the proposed cooperation between the functions of the telephone switchboard and the computer apparatus.

DESCRIPTION OF EMBODIMENTS AT PRESENT PREFERRED

Figure 1:
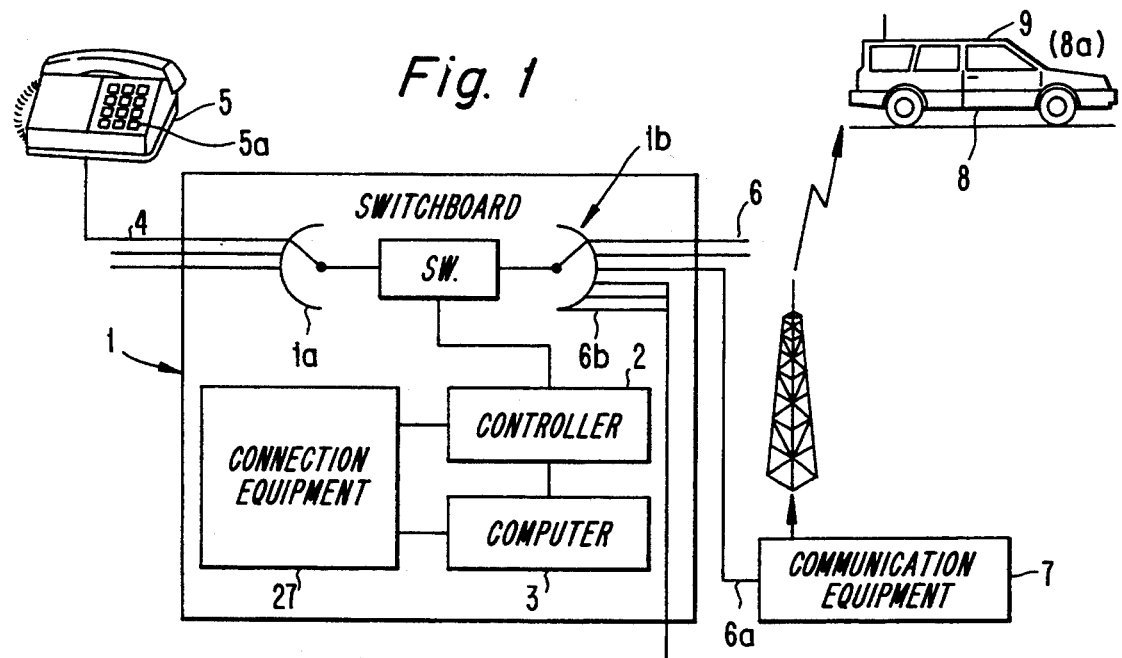
FIG. 1 is a diagrammatic illustration of an inventive system, solely one stationary subscriber apparatus and solely one mobile subscriber being shown for the sake of clarity.

FIG. 1 illustrates diagrammatically a system constructed in accordance with the principles of the present invention and includes a telephone switchboard, subscriber exchange or like telephone station 1 provided with selector switches 1a and 1b which function to connect each incoming call to a subscriber selected by the caller.

In the present case, each call is directed to a chosen "group number" and is dealt with by a separate computer arrangement, without the assistance of a telephonist or telephone operator.

The switchboard 1 includes a control means 2 and a computer apparatus 3 which is connected by cables to the control means, the control means 2 and the computer means 3 cooperating to activate and carry out a selected through-connection function. This through-connection function is referred to as a "call transfer" and is earlier known as an integrated function of the telephone station or switchboard, and consequently the necessary activation of this function will not be described in detail here. The invention presumes that this function is activated through the computer means 3.

It is sufficient in this case to establish that an incoming call, arriving from a person having a stationary subscriber apparatus 5 via a group number, is connected directly to a mobile subscriber apparatus selected by the computer means on the basis of particular criteria, as result of cooperation with equipment in the telephone switchboard or exchange, which can influence the call transfer function, among other things.

The telephone switchboard 1 may be connected to a number of stationary subscriber apparatus forming part of the system, of which only one such apparatus is shown in FIG. 1 and identified by reference numeral 5, by means of a number of physical telephone lines 4.

The switchboard 1 has a number of outgoing lines 6, of which some lines 6a are connected to equipment 7 by means of which a speech connection can be established to a mobile subscriber apparatus chosen from a number of available mobile apparatus, only one such mobile apparatus 8 being shown in the Figure.

When the aforesaid person dials a "group number" on the subscriber apparatus 5, the apparatus is through-connected to the selected outgoing lines 6b to which the computer devices 10 and 11 are connected.

It is assumed that the mobile subscriber apparatus 8 forming part of the inventive system is installed in a taxi vehicle 9 and that the said apparatus is served by a taxi driver.

The transfer of a call from the unit 7 to the subscriber apparatus 8 can be effected in a manner known per se, for instance with the aid of the mobile telephone system NMT 900/450, which has been used in Sweden for many years.

As shown in FIG. 1, the telephone switchboard may include external equipment, such as an external computer 10, or may be connected thereto by means of one or more lines 6b.

The system illustrated in FIG. 1 includes a queue organizing means 11 which is intended to place calls arriving from a number of stationary subscriber apparatus 5 simultaneously into a queue order.

For the sake of simplicity, however, the following description is based on the occurrence of a single call, and consequently the function of the queue organizing device 11 will not be described in detail here.

The aforesaid telephone switchboard and the computer 10 coacting therewith enables a stationary subscriber apparatus 5 to be connected selectively to a mobile subscriber apparatus 8 chosen by the computer and being located in the near vicinity, even when the call made on the stationary subscriber apparatus is directed to a given group number.

In order for this to be possible, it is necessary for the telephone switchboard 1 to connect all incoming calls directed to the aforesaid group number to the computer 10, which is programmed to ask questions in artificial speech with the aid of devices and first means 21, 30 subsequent to a call having been established between the stationary subscriber apparatus 5 and the computer 10, and to ascertain the geographical area and/or geographical location (address) of the stationary subscriber apparatus 5 on the basis of the replies to said questions (code).

This can be achieved by instructing the caller, through artificial speech, to insert the first two digits of his own telephone number, using the telephone buttons 5a to this end, this code being inserted into means 22, shown in FIG. 3, connected to a device 23 which functions to ascertain the geographical area on the basis of said code.

Alternatively, the stationary subscriber apparatus 5 may be asked to insert the zip code or postal code of his particular area.

Another alternative is for the switchboard 1, in coaction with the computer 10, to ascertain the caller's telephone number and for the computer to establish the location and even the address of the stationary subscriber apparatus on the basis thereof.

The telephone switchboard 1 and the computer 10 are constructed to instruct, with the aid of other means 31, each of the mobile subscriber apparatus 8 to insert through the buttons on respective apparatus a code which is significant to the area or the location in which they are located at that particular time, this code being delivered to a device 32. This device is connected to a means 33 for evaluating and ascertaining, in coded form, each of the geographical areas and/or locations in which a number of free mobile subscriber apparatus 8 are situated. All of these vehicles are placed in a queue order in a queue organizing device 45, together with a code corresponding to a geographical area.

The order in which the mobile telephone apparatus 8 are placed in the queue is based primarily on whether or not the vehicle belongs to that area and secondly on the length of time that the vehicle has been idle.

Figure 2:
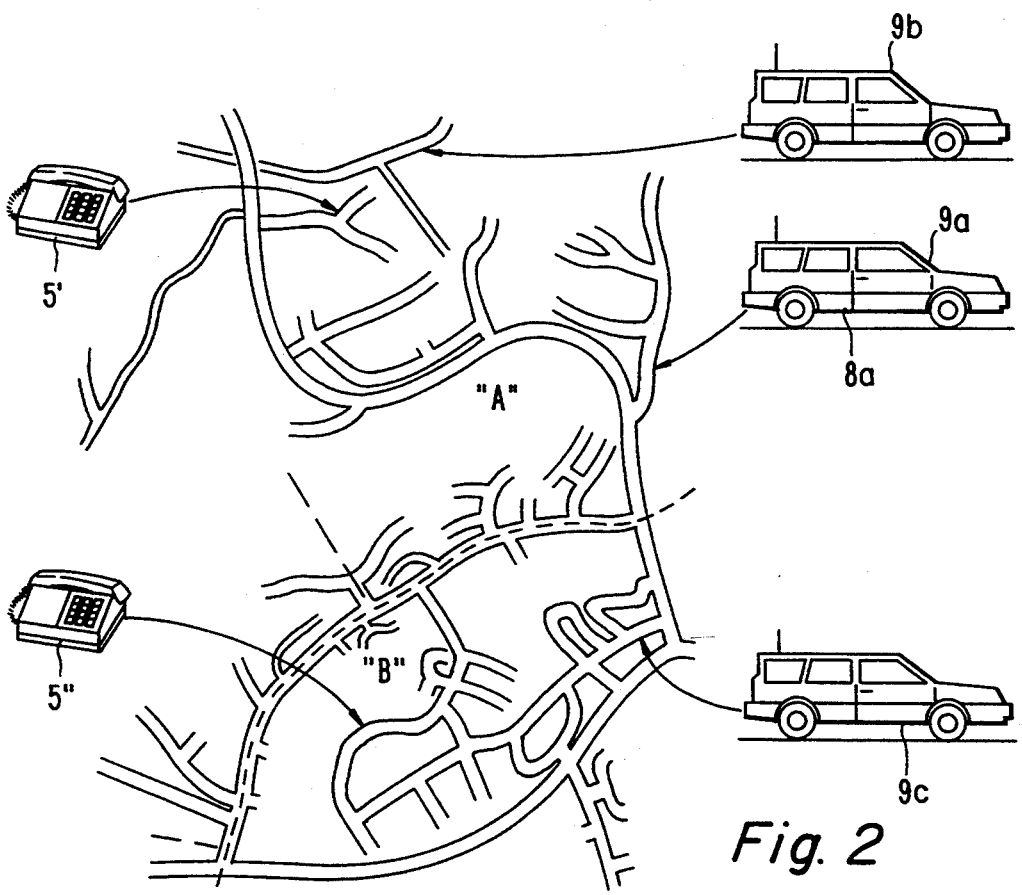
FIG. 2 is a map showing two stationary subscriber apparatus and three mobile subscriber apparatus, so as to illustrate the conditions fundamental to the inventive concept.

It can be imagined that all vehicles located within one and the same area, vehicles 9a and 9b, located within an area A in FIG. 2, are given a queue order, implying that when a stationary subscriber apparatus 5' dials the common group number, said apparatus 5' will be connected to the vehicle, for instance the vehicle 9a, which has waited the longest in the queue.

In the case of high call frequencies and short waiting times, this priority principle can be ignored, and the vehicle 9b selected simply because it is nearest to the area concerned.

It can also be imagined that a stationary subscriber 5" calls from an area B in which no vehicle is present or waiting. In this case, the call can be connected to the nearest vehicle 9a within a neighbouring area A.

FIG. 3 is a greatly simplified, proposed block schematic of the fundamental functions of the present invention.

The construction of each block will not be described in detail here, since the blocks are known in principle and/or can be readily constructed by one of normal skill in this art who has sufficient knowledge of the function of said blocks, which are explained in detail herebelow.

As illustrated in FIG. 3, each call from the subscriber 5 to the group number dialled is connected to the lines 6b through the switchboard 1, by means of a device 21 which can be connected to a voice generator 30.

This voice generator 30 instructs the subscriber 5 to dial on his buttons 5a the first two digits of the telephone number of said subscriber apparatus, for instance the digits 36, this code being received by a computer 10 which includes said means 22.

The code received in the means 22 is converted to a locality or area identification in a further means 23.

The system also affords the possibility of connecting each call from a mobile subscriber apparatus 8 through the telephone switchboard 1 to the voice generator 30, by a further means 31.

This voice generator 30 instructs the caller on subscriber apparatus 8 to dial on his buttons 8a a code which corresponds to the area or location in which the apparatus is found, this code being 36 for the area A, said code being received in a computer 10 including means 32.

The code received in the means 32 is converted to a locality or area identification in a means 33.

It lies within the scope of the invention to insert the requisite information in the computer in this latter case without the aid of a voice generator 30.

The contents of the means 23 and 33 can be compared with one another by means of a comparison circuit 40. The area in which the stationary subscriber 5 is located is compared with all of the available mobile subscriber apparatus whose prevailing locations in said area are stored in the queue organizer 45.

When several available mobile subscriber apparatus are found within one and the same area, the vehicle which has waited the longest is chosen.

Thus, the mobile apparatus having area identity and having waited the longest time without a fare, i.e. the vehicle given the highest priority, is indicated by a means 41 on the basis of the location of the subscriber 5.

A connection is established to the subscriber 8 via a means 42 and via known means 26 in the telephone switchboard 1, and when a response is established in the means 43, a call transfer function is activated via a means 44 such that the stationary subscriber apparatus 5 and the selected mobile subscriber apparatus 8 are in direct speech connection, via the equipment 27.

With each call from each stationary subscriber apparatus 5, the device 23 ascertains the geographical area of the stationary subscriber and optionally also the geographical location thereof and the unoccupied mobile subscriber apparatus 9a, 9b available for driving are sorted and stored in a queue organizer 45, and the comparator 40 evaluates and indicates the mobile subscriber apparatus 8 which has the highest priority at that particular time.

The priority order may be based primarily on whether or not a taxi vehicle belongs to that area and secondly on the length of time a taxi vehicle has remained in the queue without a fare, although priority may also be based on other criteria, such as which vehicle is nearest the location of the stationary subscriber apparatus or has the simplest route to said location.

The call transfer function thus connects the stationary subscriber apparatus 5 to the selected, unoccupied taxi vehicle free to take incoming calls and being first in the queue, whereby the calling apparatus is connected directly to that mobile subscriber apparatus which can best suit his purposes without the caller having been active in selecting precisely that subscriber apparatus 8a or taxi vehicle.

Other possibilities are also conceivable. For example, the telephone switchboard may be constructed to ascertain the telephone number of the caller with the aid of known means, or the stationary apparatus 5 may be instructed to insert through the telephone buttons 5a a code, such as a postal code (or zip code) corresponding to the area concerned.

Each of the mobile subscriber apparatus 8 included in the system include means 8a which enables a connection to be made to the switchboard 1, said means 8a also being constructed to feed into tile means or equipment 32 provided in the computer a code which corresponds to the geographical area or geographical location of the mobile apparatus concerned. When the respective mobile apparatus have established telephone connection with the computer 10 and a code has been transmitted, each mobile apparatus 8 is assigned a queue order "first in—first out" in the device 45.

The switchboard and/or computer apparatus also include means 30 which is constructed to generate predetermined, selected speech sequences, so-called artificial speech, and to give a caller certain instructions and to ask certain questions through the medium of means not shown. The answers to the questions asked can be stored and processed during the time so required, via code taking.

The telephone switchboard 1 and/or the computer apparatus 10 are provided with means 48 for storing a desired time, etc. of a prebooking ordered from a stationary subscriber apparatus 5 and to establish, prior to the selected time, a telephone connection, via the computer apparatus 10, with a selected mobile subscriber apparatus 8, which listens to a recorded message of the prebooking, or is informed of the message by an artificial voice.

It will be understood that the invention is not restricted to the aforedescribed exemplifying embodiment thereof and that modifications can be made within the scope of the invention defined in the following claims.

I claim:

1. In a communication system comprising a stationary subscriber apparatus and a plurality of mobile subscriber apparatus, a system for connecting an incoming call from the stationary subscriber apparatus to a telephone number associated with the plurality of mobile subscriber apparatus to a selected mobile subscriber apparatus comprising:
means for generating voice messages;
a switchboard including a computer, :means for establishing speech connections between the stationary subscriber apparatus and ones of the mobile subscriber apparatus, first means for connecting the incoming call to an outgoing line through the switchboard and to the generating means upon receipt of the incoming call, and second means for connecting calls from mobile subscriber apparatus through the switchboard to the generating means;
wherein the switchboard ascertains and stores for each unoccupied mobile subscriber apparatus a respective geographic location;
the establishing means establishes a speech connection between the stationary subscriber apparatus and the selected mobile subscriber apparatus;
either the switchboard ascertains the stationary subscriber apparatus's telephone number and determines therefrom the stationary subscriber apparatus's geographic location, or the generating means generates a voice message that requests entry of a code number indicating the stationary subscriber apparatus's geographic location; and the switchboard selects the mobile subscriber apparatus based on a priority assigned to the mobile subscriber apparatus, each mobile subscriber apparatus's priority being determined by at least one of: proximity to the stationary subscriber apparatus; assignment to an area that includes the stationary subscriber apparatus's geographic location; duration that the mobile subscriber apparatus has been unoccupied; and availability for the stationary subscriber apparatus's geographic location.

2. The system of claim 1, wherein the switchboard further includes means for storing messages entered through the stationary subscriber apparatus.

3. The system of claim 1, wherein the switchboard further includes means for storing information, entered through the stationary subscriber apparatus, concerning a selection of a mobile subscriber apparatus at a predetermined future time, and the switchboard establishes a speech connection between the stationary subscriber apparatus and the selected mobile subscriber apparatus at the predetermined future time.

* * * * *